(12) United States Patent  
Shankar et al.

(10) Patent No.: US 6,907,453 B2  
(45) Date of Patent: Jun. 14, 2005

(54) PER COS MEMORY PARTITIONING

(75) Inventors: Laxman Shankar, San Jose, CA (US); Shekhar Ambe, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 295 days.

(21) Appl. No.: 10/245,289

(22) Filed: Sep. 18, 2002

(65) Prior Publication Data

US 2004/0052211 A1 Mar. 18, 2004

(51) Int. Cl.$^7$ .......................... G06F 12/00; G06F 13/00; H04L 12/56
(52) U.S. Cl. ....................... 709/207; 709/215; 370/412; 711/151; 711/153; 711/158
(58) Field of Search ................................. 709/207, 215; 320/412; 711/153, 151, 158

(56) References Cited

U.S. PATENT DOCUMENTS

| | | | |
|---|---|---|---|
| 5,497,371 A | * | 3/1996 | Ellis et al. .................. 370/412 |
| 5,828,653 A | | 10/1998 | Goss |
| 5,831,980 A | | 11/1998 | Varma et al. |
| 5,842,038 A | | 11/1998 | Williams et al. |
| 6,061,351 A | | 5/2000 | Erimli et al. |
| 6,175,902 B1 | | 1/2001 | Runaldue et al. |
| 6,272,567 B1 | * | 8/2001 | Pal et al. ...................... 710/56 |
| 2001/0036157 A1 | * | 11/2001 | Blanc et al. ................. 370/235 |

* cited by examiner

*Primary Examiner*—Jack A. Lane
(74) *Attorney, Agent, or Firm*—Squire, Sanders & Dempsey L.L.P.

(57) ABSTRACT

A network device for monitoring a memory partitioned by an identifier can include at least one port configured to receive at least one packet. The at least one packet includes an identifier relating to priority of the at least one packet. The network device can also include a buffer memory having at least one buffer configured to store the at least one packet, and a counter configured to modify a counter value therein when the buffer memory is accessed with respect to the at least one data packet, wherein the counter corresponds to the identifier with respect to the at least one packet.

15 Claims, 3 Drawing Sheets

PER COS MEMORY PARTITIONING

BACKGROUND OF THE INVENTION

1. Field of the Invention

The present invention relates to a method of and an apparatus for monitoring a memory partitioned by Class of Service (hereinafter "CoS") in a communication network environment such as a token ring, ATM, Ethernet, Fast Ethernet and Gigabit Ethernet environment. In particular, the present invention relates to a network device for and a method of monitoring a partitioned memory based on CoS identified within a packet. The present invention can be implemented in a network component, which may include discrete devices or which may be implemented on a semiconductor substrate, such as a switching chip, in a switching architecture.

2. Description of the Related Art

In high speed networking environments, an increasing amount of packets, such as data, voice, video, and etc. are being received and transmitted between a plurality of network communication devices within the network. The packets being sent or received can be grouped by the types of packet traffic, i.e., e-mail, streaming video, voice, large document file transfer. By grouping similar types of packet traffic, the packets can be classified by a respective level of service priority, and therefore the packets can be treated accordingly. However, as the traffic of packets increases in the networking environment, the possibility of congestion on the network also increases. Accordingly, the increase in network congestion may present the packets within the network from being handled and processed according to their designated levels of service priority. As such, it is important to ensure that the packets are handled and processed in accordance to their designated levels of priority in order to increase efficiency and speed between network communication devices.

SUMMARY OF THE INVENTION

One example of the present invention can provide a method of monitoring a memory partitioned by an identifier. The method can include the steps of receiving at least one packet in a network device, and identifying the identifier relating to priority with respect to the at least one packet. In addition, the method can include the step of modifying a counter value corresponding to the identifier when the memory is accessed with respect to the at least one packet.

In another example, the present invention can relate to a network device for monitoring a memory partitioned by an identifier. The network device can have at least one port configured to receive at least one packet. The at least one packet can include an identifier relating to priority of the at least one packet. The network device further can have a buffer memory having at least one buffer configured to store the at least one packet, and a counter configured to modify a counter value therein when the buffer memory is accessed with respect to the at least one data packet. The counter can corresponds to the identifier with respect to the at least one packet.

In yet another example, the present invention can be directed to a system of monitoring a memory partitioned by an identifier. The system can include a receiving means for receiving at least one packet in a network device, an identifying means for identifying the identifier relating to priority with respect to the at least one packet, and a modifying means for modifying a counter value corresponding to the identifier when the memory is accessed with respect to the at least one packet.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
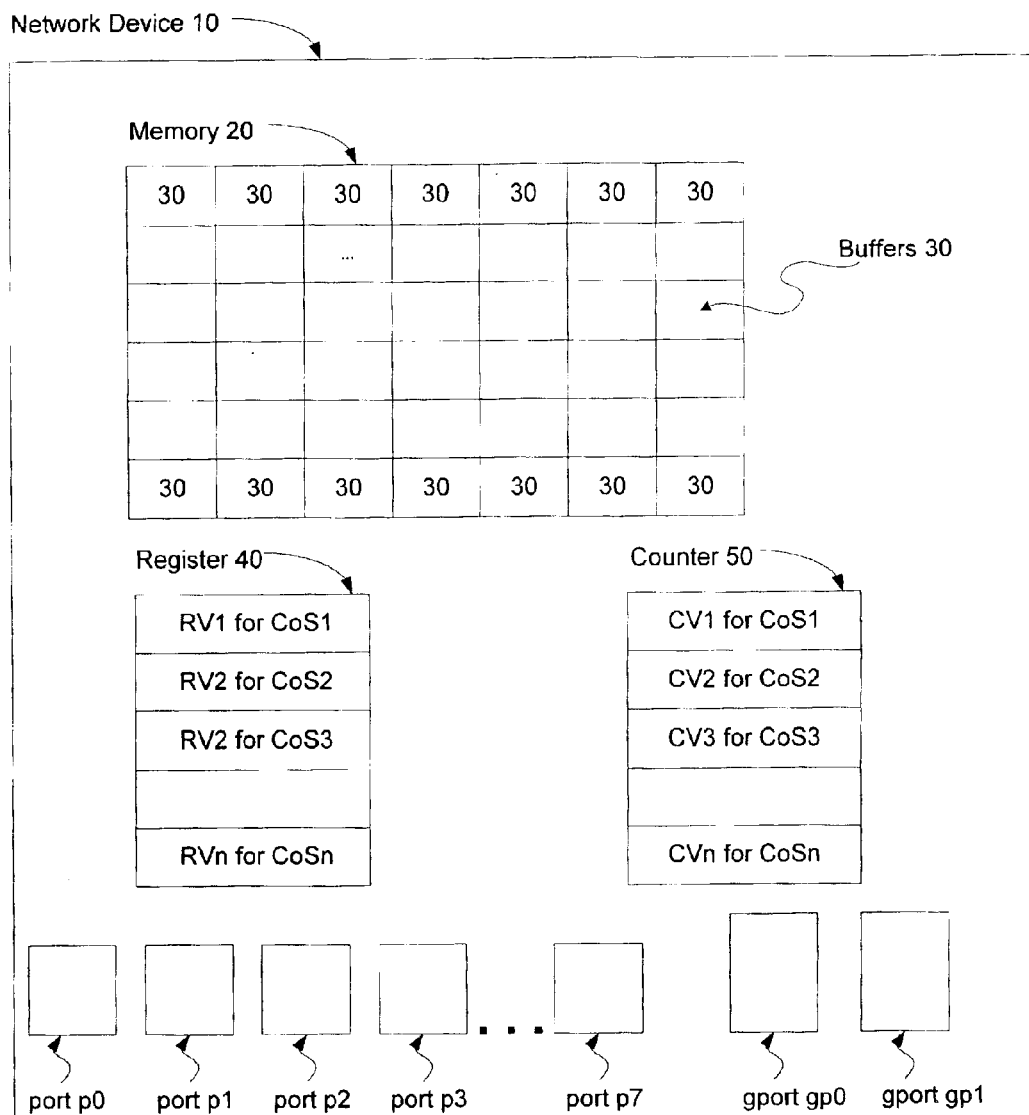
FIG. 1 illustrates one example of a configuration for monitoring a memory per CoS in accordance to the present invention.

FIG. 1 illustrates one example of a hardware configuration that can monitor a memory partitioned by CoS identifiers of a packet within a network device, in accordance with the present invention. In this example, the network device can be a switch, a switching chip, or a network switching component. The hardware configuration of FIG. 1 can be in an integrated, modular and single chip solution, and therefore can be embodied on a semiconductor substrate, such as silicon. Alternatively, the hardware configuration of FIG. 1 can be a plurality of discrete components on a circuit board.

The configuration as shown in FIG. 1 illustrates a network device 10, such as a switching chip. The network device 10 can have a plurality of ports, such as port p0, port p1, port p2, port p3, port p4, port p5, port p6, port p7, and gports gp0 and gp1. In this example, the network device can have eight fast Ethernet ports, ports p0, p1, p2, p3, p4, p5, p6, p7 and two Gigabit ports, gports pg0 and pg1 with one expansion port that can chain other chips together (expansion port not show). Furthermore, the network device 10 can include a memory 20, such as a buffer memory. The memory 20 can have a plurality of buffers 30 therein for holding or storing at least one packet. Each buffer 30 can be addressed by at least one pointer, and the buffers 30 can be chained or can be referenced to using a pointer queue (not shown). In this example, the memory 20 can be embedded within the network device 10. However, it is noted that the memory 20 can be an external memory embedded outside the network device 10.

Each port, ports p0, p1, p2, p3, p4, p5, p6, p7, and gports gp0 and gp1, can be a receiving port, or an ingress port as well a transmitting port, or an egress port, for receiving and transmitting at least one packet, respectively. The one or more packet(s) received and transmitted, according to the present invention, can contain data in any format configured for a network environment, such as e-mail, streaming video, voice, large document file transfer, and etc. Although the network device 10 of the present example can receive and transmit one or more packet(s), in other examples of the present invention, the network device 10 can also receive and transmit one or more frame(s), or one or more data cell(s). Therefore, any reference to a packet herein can also refer to at least a frame, a cell, or a data packet, a data frame or a data cell.

Figure 2:
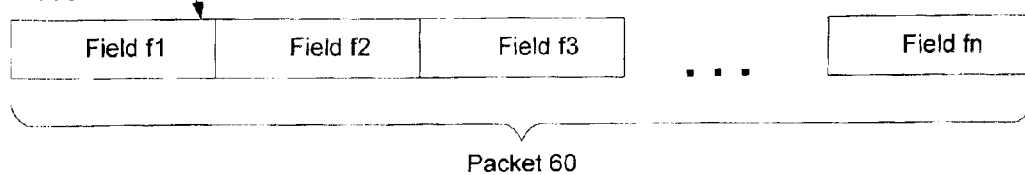
FIG. 2 illustrates one example an incoming packet in accordance to the present invention.

FIG. 2 illustrates one example of a packet 60 that can be received in or transmitted out of any one of ports p0, p1, p2, p3, p4, p5, p6, p7 and gports gp0 and gp1. The packet 60 can be of any length. In this example, the packet 60 can have a plurality of fields, from field f1 to field fn. Field f1 can be the header field and can contain an identifier relating to the priority of the packet 60. The identifier can identify at least one of a plurality of CoS types with respect to the packet 60. In other words, the packet 60 can contain at least a header field wherein the header field can include a CoS identifier from a plurality of CoS identifiers. The CoS identifier can specify a level of service priority for the packet 60.

Further shown in FIG. 1, the network device 10 can include at least one storage unit 40. In this example, the storage units 40 can be registers 40, wherein each register can be configured to store a predetermined programmable register value RV1, RV2, RV3, . . . RVn therein. For instance, each register 40 can be configured to store a programmable register value RV1, RV2, RV3, . . . RVn, each register value represents a maximum number of buffers 30 allocated for a predetermined packet identifier within a memory 20 per network device 10. In other words, each register value RV1, RV2, RV3, . . . RVn can specify or set a maximum number or quantity of buffers 30 specifically reserved for a predetermined CoS identifier. Therefore, each register value RV1, RV2, RV3, . . . RVn can partition a memory 20 based on a predetermined number of buffers allocated for each one of the CoS identifiers.

As mentioned above with respect to an example shown in FIG. 2, the packet identifier can be a CoS identifier that identifies a level of service priority for a grouping of similar type of packet traffic. Accordingly, the example of FIG. 1 shows at least one register 40, wherein each register 40 can correspond to a particular CoS identifier, such as CoS0, CoS1, CoS2, . . . . CoSn.

For example, suppose memory 20 can have a total of five hundred memory buffers 30 therein. Additionally, suppose the network device can have five registers 40. Each register 40 can be preprogrammed to include a predetermined register value where RV1=200, RV2=150, RV3=75, RV4=50, and RV5=25, respectively therein. Therefore, each register value RV1, RV2, RV3, RV4 and RV5 can correspond to CoS1, CoS2, CoS3, CoS4, and CoS5, respectively. Accordingly, memory 20 having five hundred buffers therein can be partitioned based on the identifiers of CoS1, CoS2, CoS3, CoS4 and CoS5, wherein two hundred fifty buffers out of the five hundred buffers can be allocated to CoS1, one hundred fifty buffers out of the five hundred buffers can be allocated to CoS2, seventy-five buffers out of the five hundred buffers can be allocated to CoS3, fifty buffers out of the five hundred buffers can be allocated to CoS4 and twenty-five buffers out of the five hundred buffers can be allocated to CoS5. Thus, the memory 20 can be partitioned per CoS, per network device 10, based on the predetermined register values RV1, RV2, RV3, . . . RVn programmed within the registers 40.

Also shown in FIG. 1, the network device 10 can have at least one counter 50, wherein each counter 50 can also correspond to a particular packet identifier relating to the priority of the packet. In this example, each counter 50 can correspond to a packet identifier, such as a CoS identifier. The example in FIG. 1 shows the CoS identifier to be CoS1, CoS2, CoS3, . . . CoSn. Each counter 50 can be configured to include a counter value CV1, CV2, CV3, . . . CVn therein. Additionally, each counter 50 can modify the counter value CV1, CV2, CV3, . . . CVn therein when a memory 20 is accessed with respect to a packet 60. For instance, a counter 50 corresponding to a particular packet identifier CoS1, CoS2, CoS3, . . . . CoSn, can modify a counter value CV1, CV2, CV3, . . . CVn when the packet 60 corresponding to the particular packet identifier is stored in the memory 20 or transmitted out of the memory 20.

Thus, when a packet 60 is received in a port and is thereafter identified as having a particular CoS, for example CoS1, a counter 50 corresponding to the packet identifier of CoS1 can increase a counter value CV1 when the packet received is subsequently stored or held in at least one buffer 30 within the buffer memory 20. Accordingly, the counter 50 for that particular CoS1 can therefore increase the counter value CV1 by a number or quantity of at least one buffer 30 within memory 20 required to store or hold the packet 60 received.

In the alternative, when a packet 60 is ready to be transmitted out of a network device 10 and the packet identifier is identified as having, for example, a CoS3, then a counter 50 corresponding to CoS3 can decrease a counter value CV3 when the packet 60 is indeed transmitted out of the memory 20. Upon transmitting the packet 60 out of the network device 10, the buffers 30 that once stored the packet 60 are thereafter made available within memory 20. As such, the counter 50 for CoS3 can therefore decrease the counter value CV3 by a number or quantity of at least one buffer 30 freed-up within the memory 20 by the transmission of the data packet 60 out of the network device 10.

In other words, suppose for example a packet 60 is received in an ingress port p2 of a network device 10. Further suppose that the packet 60 received has an identifier, such as a CoS3 identifier therein. In addition, suppose a register 40 corresponds to the CoS3 identifier, and a register value RV3 stored within the register 40 has a predetermined value of seventy-five. Upon receiving the packet 60, a counter value CV3 corresponding to the CoS3 identifier has a counter value of thirty-eight. In other words, the counter value of thirty-eight represents or signifies that a thirty-eight CoS 3 buffers out of the seventy-five CoS3 allocated buffers have been assigned or used up within memory 20. Therefore, if the received packet 60 requires ten buffers to store thereof in memory 20, the present example can store the packet 60 within the remaining thirty-seven buffers allocated for CoS3 within memory 20. Furthermore, the counter value CV3 is increased from a counter value of thirty-eight to a counter value of forty-eight.

Suppose for another example that a packet 60 is ready to be transmitted out of a network device 10. Suppose that the packet 60 is identified as having a packet identifier of CoS2, and the packet 60 is being stored within five buffers allocated or reserved for the CoS2 identifier. In addition, suppose prior to transmitting the packet 60 out of the network device 10, the counter value CV2 corresponding to the CoS2 identifier has a counter value of eighty-eight. After transmitting out the data packet 60, the five buffers that once stored the packet 60 are thereafter made available or have been freed-up within memory 20. As such, the counter 50 corresponding to CoS2 can decrease the counter value CV2 from eighty-eight to eighty-three.

It is noted that the specific examples provided herein are examples of the present invention, and are not provided to limit the scope and nature of thereof in any manner or way.

Figure 3:
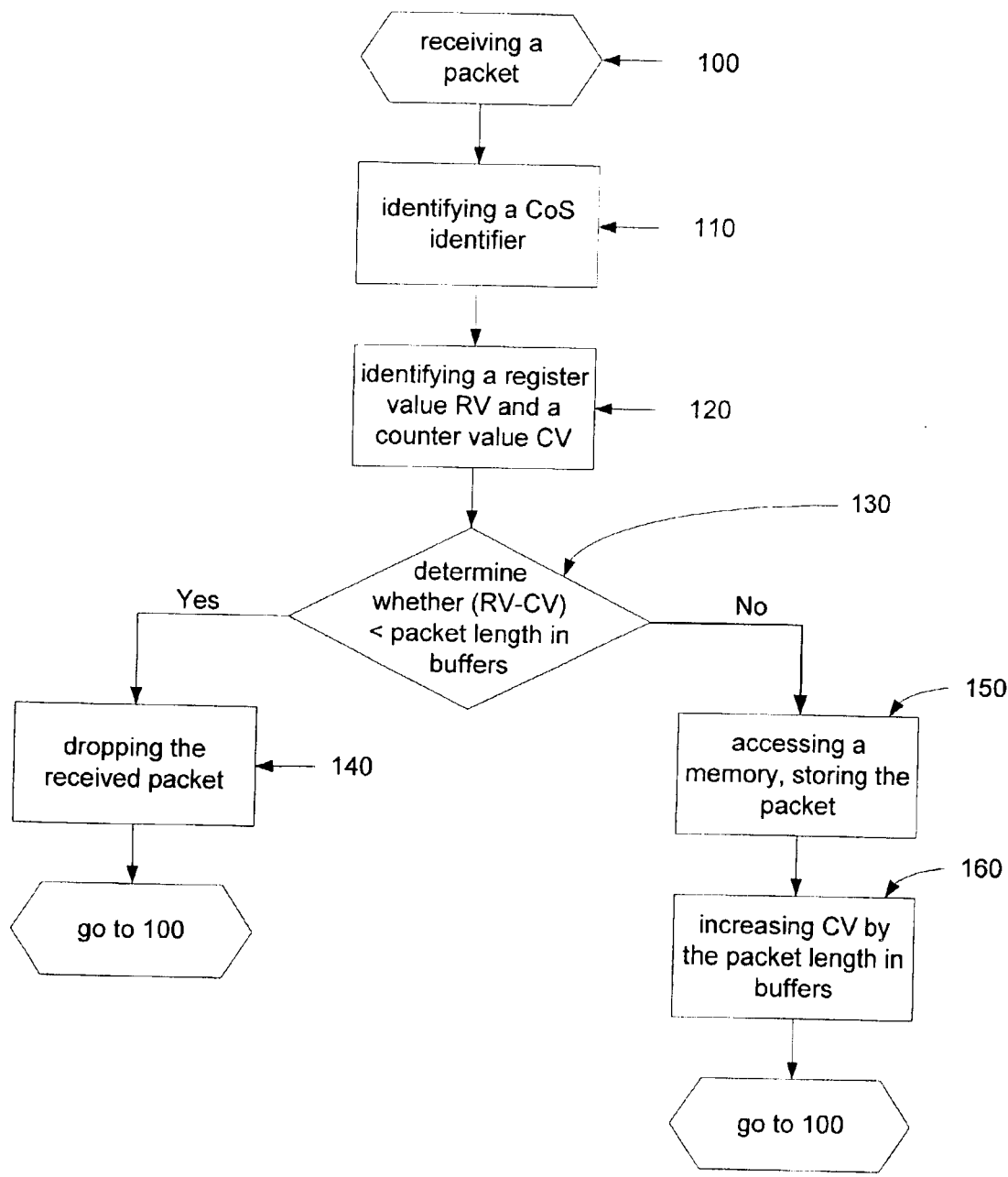
FIG. 3 illustrates a flow chart illustrating one example of a method of monitoring a memory per CoS in accordance to the present invention.

FIG. 3 illustrates one example of a method of monitoring a memory partitioned by CoS identifiers, in accordance with the present invention. The method of the present example can be implemented in hardware, or software, or a combination of both hardware and software.

An ingress port in a network device 10 can receive at least one packet 60 therein. Accordingly, step 100 of FIG. 3 can receive a packet 60 in an ingress port of a network device 10.

Upon receiving a packet 60, step 110 of FIG. 3 can identify an identifier, such as a CoS identifier with respect to the packet 60 received in the ingress port. In addition, step 120 can identify a counter value CV1, CV2, CV3, . . . CVn within a counter 50 corresponding to the CoS identifier with respect to the packet 60 received. Furthermore, step 120 can identify a predetermined programmable register value RV1, RV2, RV3, . . . RVn stored within a register 40 corresponding to the CoS identifier with respect to the packet 60 received. In other words, step 120 can identify a register value RV1, RV2, RV3, . . . RVn stored within a register 40 wherein the register value RV1, RV2, RV3, . . . RVn can represent or specify a number of maximum buffer(s) allocated to or reserved for a particular CoS within memory 20, per network device 10. Step 120 can also identify a counter value CV1, CV2, CV3, . . . CVn within a counter 50, wherein the counter value CV1, CV2, CV3, . . . CVn can keep track or keep count of a number of buffer(s) that have been assigned to or used for the particular CoS within memory 20.

Once a counter value CV1, CV2, CV3, . . . CVn and a register value RV1, RV2, RV3, . . . RVn corresponding to the CoS identifier are identified, step 130 of FIG. 3 can determine whether the compare the identified counter value CV1, CV2, CV3, . . . CVn corresponding to the CoS, with the identified register value RV1, RV2, RV3, . . . RVn corresponding to the same CoS. In other words, step 130 can determine whether the difference between the register value and the counter value (i.e., RV1–CV1) corresponding to the CoS identifier is less than the packet length in buffers 30.

If it is determined at step 130 that the difference between the register value and the counter value (i.e., RV1–CV1) is indeed less than the packet length in buffers 30, then step 140 of FIG. 3 can drop the packet 60 received because no available buffers 30 corresponding to that particular CoS identifier within memory 20 can be accessed to store the packet 60 received.

In the alternative, if it is determined at step 130 that the difference between the register value and the counter value (i.e., RV1–CV1) is not less than the packet length in buffers 30, then the present example at step 150 can access a memory 20 and store the packet 60 within the available buffer(s) specifically allocated to and reserved for the specific CoS identifier of the packet 60 received.

Upon storing the packet 60 within the buffer(s) allocated for the specific CoS identifier, step 160 of the present example can increase a counter value CV1, CV2, CV3, . . . CVn corresponding to the same CoS identifier. In other words, step 160 of FIG. 3 can increase a counter value CV1, CV2, CV3, . . . CVn having the same CoS identifier, by the packet length in buffers 30. For example, suppose it is determined that a packet 60 is received within a network device 10 and is determined to have an identifier of CoS3. In addition, suppose the received packet 60 requires six CoS3 buffers to store thereof within memory 20. Accordingly, when the memory 20 is accessed to store the packet received therein, a counter value CV3 which corresponds to the CoS3 identifier can thereby be increased with a value of six.

Figure 4:
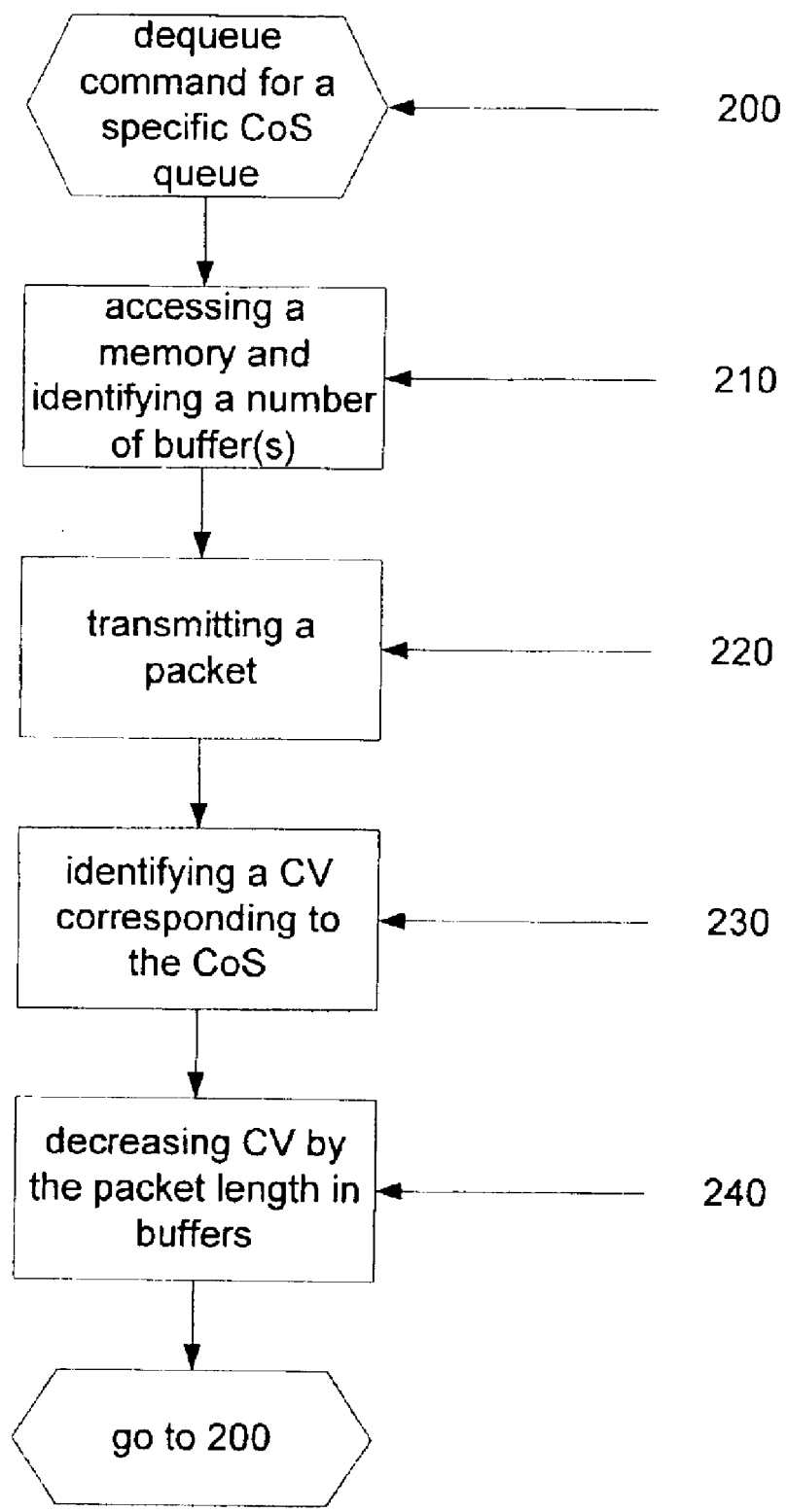
FIG. 4 illustrates a flow chart illustrating another example of a method of monitoring a memory per CoS in accordance to the present invention.

FIG. 4 illustrates one example of a method of monitoring a memory partitioned by CoS identifiers, in accordance with the present invention. The method of the present example can be implemented in hardware, or software, or a combination of both hardware and software.

As mentioned in an example above, the network device 10 can include a memory 20, such as a buffer memory. The memory 20 can have a plurality of buffers 30 therein for holding or storing at least one packet. Step 200 of FIG. 4 can dequeue a command for a specific CoS queue of a port within the network device 10.

Upon dequeuing the command for the specific CoS queue of a port, step 210 can access the memory 20 and identify a number or quantity of buffer(s) storing such packet 60 within the memory 20.

At step 220 of the example shown in FIG. 4, the packet 60 can be transmitted out of the network device 10 and thereby can free up or make available within memory 20 a number of buffer(s) that was used to store the packet 60 prior to transmission. In addition, the step 230 can identify a counter value CV1, CV2, CV3, . . . CVn within counter 50 that corresponds to the same CoS identifier as that of the transmitted packet 60. Thereafter, step 240 of FIG. 4 can decrease the identified counter value CV1, CV2, CV3, . . . CVn having the same CoS identifier as that of the transmitted packet 60 with a value representing the number of buffer(s) that was/were make available or freed-up in the memory 20 from the transmission of the packet 60.

In other words, suppose for example that a packet 60 stored within memory 20 is transmitted out of a network device 10, thereby freeing up five buffers within memory 20. Therefore, step 230 can identify a counter value CV2 having an identifier of CoS2, and thereafter step 240 can decrease the counter value CV2 by a value of five, wherein the value five represents the number of buffers freed-up from the transmission of the packet 60.

The above-disclosed configurations of the present invention can be embodied in a hardware configuration such as a semiconductor substrate. Furthermore, the methods of the invention can be implemented in hardware, or software, or a combination of both hardware and software. In addition, a person of skill in the art with respect to semiconductor design and manufacturing would be able to implement the various elements and methods of the present invention onto a single semiconductor substrate, based upon the architectural description discussed above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of monitoring a memory partitioned by an identifier, said method comprising the steps of:
   receiving at least one packet in a network device;
   identifying the identifier relating to priority with respect to the at least one packet;
   modifying a counter value corresponding to the identifier when a memory is accessed with respect to the at least one packet; and
   dropping the at least one packet when the difference of a predetermined value corresponding to the identifier and the counter value corresponding to the identifier is less than a quantity of buffers required to store the at least one packet in the memory.

2. The method of claim 1, wherein the step of modifying comprises the steps of:

increasing the counter value corresponding to the identifier when the at least one packet is stored in the memory; and decreasing the counter value corresponding to the identifier when the at least one packet is transmitted out of the memory.

3. The method of claim 2, wherein the step of increasing comprises the steps of:

determining the quantity of buffers required to store the at least one packet in the memory; and increasing the counter value by the quantity of buffers.

4. The method of claim 2, wherein the step of decreasing comprises the steps of:

determining the quantity of buffers made available in the memory when the at least one packet is transmitted out of the memory; and decreasing the counter value by the quantity of buffers.

5. The method of claim 2, wherein the step of identifying comprises the step of:

identifying a class of service with respect to the at least one packet.

6. A network device for monitoring a memory partitioned by an identifier, said network device comprising:

at least one port configured to receive at least one packet, wherein the at least one packet includes an identifier relating to priority of the at least one packet;

a buffer memory having at least one buffer configured to store the at least one packet;

a counter configured to modify a counter value therein when the buffer memory is accessed with respect to the at least one data packet, wherein the counter corresponds to the identifier with respect to the at least one packet; and a storage unit configured to store a predetermined value, wherein the storage unit corresponds to the identifier relating to priority of the at least one packet, and wherein the at least one port is configured to drop the at least one packet when the difference of the predetermined value and counter value is less than a quantity of the at least one buffer required to store the at least one packet in the buffer memory.

7. The network device of claim 6, wherein the counter is configured to increase the counter value when the at least one packet is stored in the buffer memory, and wherein the counter is configured to decrease the counter value when the at least one packet is transmitted out of the buffer memory.

8. The network device of claim 7, wherein the counter is configured to increase the counter value by the quantity of the at least one buffer required to store the at least one packet in the buffer memory.

9. The network device of claim 7, wherein the counter is configured to decrease the counter value by the quantity of the at least one buffer made available when the at least one packet is transmitted out of the buffer memory.

10. The network device of claim 7, wherein the at least one port configured to receive at least one data packet, wherein the at least one data packet includes a class of service.

11. A system of monitoring a memory partitioned by an identifier, said system comprising:

a receiving means for receiving at least one packet in a network device;

an identifying means for identifying the identifier relating to priority with respect to the at least one packet;

a modifying means for modifying a counter value corresponding to the identifier when the memory is accessed with respect to the at least one packet; and a dropping means for dropping the at least one packet when the difference of a predetermined value corresponding to the identifier and the counter value corresponding to the identifier is less than a quantity of buffers required to store the at least one packet in the memory.

12. The system of claim 11, wherein the modifying means comprises:

an increasing means for increasing the counter value corresponding to the identifier when the at least one packet is stored in the memory; and a decreasing means for decreasing the counter value corresponding to the identifier when the at least one packet is transmitted out of the memory.

13. The system of claim 12, wherein the increasing means comprises:

a determining means for determining the quantity of buffers required to store the at least one packet in the memory; and an increasing means for increasing the counter value by the quantity of buffers.

14. The system of claim 12, wherein the decreasing means comprises:

a determining means for determining the quantity of buffers made available in the memory when the at least one packet is transmitted out of the memory; and a decreasing means for decreasing the counter value by the quantity of buffers.

15. The system of claim 12, wherein the identifying means identifies a class of service with respect to the at least one packet.

* * * * *